3,056,642
GRANULAR FORM RED OIL SOLUBLE DYE
Martin L. Kesler and James A. Risberg, Middlesex Boro, and Alexander Dziomba, South Plainfield, N.J., assignors to American Cyanamid Company, New York, N.Y., a corporation of Maine
No Drawing. Filed Dec. 22, 1959, Ser. No. 861,173
5 Claims. (Cl. 8—3)

This invention relates to a new, improved, dustless, free flowing, oil soluble red dye and to a process for preparing the same. More specifically, this invention relates to an oil soluble dye composition comprising a mixture of compounds of the formula

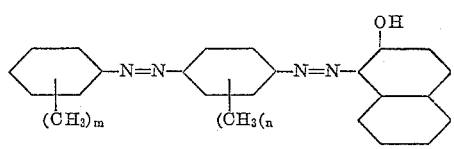

in which $m$ and $n$ are each 1 or 2, the mixture having a composition range in which the ratio of compounds in which $m$ equals 1 to compounds in which $m$ equals 2 and also the ratio of compounds in which the ratio of $n$ equals 1 to compounds in which $n$ equals 2 both lie between 3:1 and 1:3, and in which dye composition there is present between 0.7 and 1.0% by weight of free beta-naphthol, the composition having less than 0.5% particles greater than 20 mesh in size and having a further prescribed particle size analysis as described hereinafter, which composition is characterized by its resistance to caking at temperatures from ambient to 65° C., ready solubility in hydrocarbons and dustlessness. More specifically also, it relates to a process for preparing such a dustless, non-caking, free-flowing, oil-soluble dye composition as described below.

Dyes for coloring petroleum products have been known and used for some time, either for identification as to grade or origin or, in some cases, for sales appeal. For the coloring, by commercial processes, such as gasoline stock and fuel oil, such dyes must meet definite specifications as to the melting point, solubility, fluidity, non-caking and rate of solution. Thus in the dry dye eductor system, wherein a suitable probe is inserted into a container of dry dye and the dye is carried by an air stream into the probe and then to a tank or a moving stream of the petroleum product to be colored, it is essential that the dye be free of lumps, non-caking, and free-flowing. Since the dye is used and stored at temperatures which may reach as high as 65° C. it is necessary that the dye be free from caking at least up to 65° C. (and preferably at higher temperatures) to insure freedom from caking on long storage under adverse conditions.

In addition to the need for non-caking material the dye should be dustless in order to prevent contamination of other materials in the plant and in order to protect workers from contact with the dye since these materials present possible hazards.

While many of the dyes available for coloring petroleum products possess some of these properties, none possess all of these properties, e.g., dyes for this purpose can be made dustless by the use of light mineral oil but the resultant products are prone to cake badly on storage at temperatures as low as 25–30° C. and exhibit poor flow qualities. On the other hand, dyes of different chemical composition having higher melting points resist caking at 65° C. but either can not be prepared in the dustless form or possess unsatisfactory solubility or rate of solution.

We have found that the red dye prepared by diazotizing a mixture of mixed xylidines and mixed toluidines, (i.e., in each case, the natural mixture of isomers formed by nitrating xylene or toluene and reducing the nitro group), coupling the diazo into a similar mixture of xylidines and toluidines, then diazotizing the resultant aminoazotoluene-aminoazoxylene mixture and coupling that diazo into beta naphthol can, by a process of further conditioning, be obtained in a form which is substantially dustless, free flowing and non-caking and which is readily soluble in gasoline and other petroleum products. The process of conditioning consists of running the coupling with beta-naphthol in such a manner that an excess of beta-naphthol is present and then heating the coupling reaction mixture, in the presence of an anionic surface-active agent of sufficiently high cloud point to remain in solution in the reaction mixture, at a predetermined rate and basicity so as to extract the excess beta naphthol at a predetermined rate. The result is that, as the slurry of dyestuff is heated, the dye passes through a slightly softened or melted stage and forms particles which then can be solidified, filtered and classified through a sieve in order to remove the small amount of larger particles, to give the oil soluble dye of our invention.

Ordinarily, when the red oil soluble dye of the chemical composition described above is formed by conventional coupling and isolation, a color is obtained which, although it may meet some of the requirements, e.g., rate of solution, is completely unsatisfactory in its non-caking and dusting properties.

The starting material for the preparation of the oil soluble dye of this invention is a mixture of aminoazotoluenes, aminoazoxylenes and, probably, mixed compounds of the nature of aminotolylazoxylenes and aminoxylylazotoluenes. It is prepared by the diazotization of a mixture of mixed xylidines and mixed toluidines, followed by the coupling of the diazotized mixture in situ into a similar mixture of xylidines and toluidines. Usually the mixture of xylidines and toluidines is partially diazotized and the resulting diazos immediately couple with the remainder of the mixture. The xylidines and toluidines must be in a ratio range of between 3:1 and 1:3. Useful products are not obtained using either the toluidines or xylidines alone. Normally it is preferred to use a 1:1 mixture of toluidines and xylidines.

The diazotization of the aminozoxylene-aminoazotoluene mixture (hereinafter referred to as AAXT) is carried out in a standard manner. The concentration to be used in the diazotization and coupling is of little importance except as it affects the concentration in the final conditioning step. One can therefore use any workable concentration and dilute up to the final conditioning concentration range. The same is true of the coupling reaction. It is however, usually preferable to diazotize and couple in such a manner and at such concentration as to end with a concentration of dyestuff in the reaction mixture fairly close to that to be used in the conditioning.

The diazotized AAXT is coupled to excess beta-naphthol in an alkaline solution. The coupling is carried out in the presence of the theoretical amount of sodium hydroxide necessary to dissolve the beta-naphthol plus sufficient excess of soda ash to keep the pH above 9.0 during the coupling. It is necessary to keep the pH in the range of 9–11. Normally the coupling is started at a pH of approximately 11 and ends at a pH of approximately 9.5. Although it is usually easier to control the pH during the coupling by using soda ash as the excess alkali, it is possible to use sodium hydroxide for this purpose. However, it is necessary, in this case, to add the excess sodium hydroxide gradually during the coupling reaction in order to hold the pH below 11. Above 11 the diazo tends to form an isodiazotate.

The coupling must be carried out in the presence of excess beta-naphthol in order to have excess beta-naphthol in the dyestuff solid formed. This latter is important in order to get proper conditioning. The excess beta-naphthol used must be between 20 and 40% of the stoichiometric amount needed in the coupling. This amounts to 5–6% on the weight of the dye formed in the coupling.

The diazotization and coupling into excess beta-naphthol must be done in situ and immediately taken into the conditioning step. The previously isolated dyestuffs cannot be mixed with beta-naphthol and then conditioned to effect a satisfactory dyestuff.

Within a limited time after the coupling, the pH of the coupling reaction mixture is adjusted to the range of 11.0 to 11.5 with the range of 11.0 to 11.2 being preferred. This is usually done with sodium hydroxide although any other caustic can be used. The time limit is necessary in order that too much of the excess beta-naphthol may not be leached out before the conditioning is run. Since loss of beta-naphthol raises the melting point, no melting is obtained and granulation into the final conditioned dyestuff does not occur. The maximum time which should be allowed to elapse before adjustment of the pH and the beginning of the conditioning treatment is approximately 2 hours, with smaller limits being necessary with smaller laboratory batches. From 30:60 minutes is usually needed to adjust the pH of an 8,000 gallon batch and the conditioning should be begun immediately after the pH has been adjusted in such cases.

At some time before the conditioning is started a surfactant must be added. It is customary and preferable to put the surfactant in the coupling mixture with the diazo and to couple in its presence, but it can be added at any later point up to the beginning of the conditioning heating. The amount, a minimum of 0.1% surfactant, based on the weight of the AAXT-beta-naphthol dyestuff present should be used in the reaction mixture during the conditioning. Usually approximately 2% is used. Greater than 20% surfactant is considered very uneconomical and unnecessary. The surfactants to be used in this conditioning are nonionic surfactants which are chemically alkylarylpolyethers, i.e., the condensates of ethylene oxide with alkyl phenols. It is necessary further that the surfactant have a cloud point above 90° C. since these nonionic compounds have a reverse solubility curve and precipitate when their solutions are heated. There must therefore, be enough ethylene oxide units in the molecule to keep the surfactant in solution during the conditioning. In order to do this the cloud point of the surfactant must be at least 90° C. and preferably over 100° C. The surfactants of this type are sold under a number of tradenames. One such is Deceresol NI. They are, as stated above, chemically the reaction products of ethylene oxide with various alkyl phenols, such as nonyl phenol, lauryl phenol, hexadecyl phenol and the like. One of the surfactants which is operative in the conditioning is the product of nonyl phenol with about 9.5 mols of ethylene oxide. The surfactant is used in the conditioning process but does not, in any way, enter into the final dyestuff. When conditioning is attempted without the presence of the surfactant the mixture forms a tarry unusable mass of agglomerate.

The conditioning of the coupling product in order to form the final dyestuff of this invention is carried out by heating the reaction mixture from the coupling temperature of about 10° to the range of about 80° to 100° C. at a controlled rate. Preferably the mixture is heated to as close to the boil as it is reasonably possible, approximately 98° being a preferred temperature. The purpose of this conditioning is to extract the excess beta-naphthol at exactly the right rate in order to permit the dyestuff to soften and to form granules during the agitation of the conditioning mixture. If the extraction is too fast the melting point of the dyestuff becomes too high to form the proper particles. If the extraction is too slow, the dye tends to form a tar because of too low a melting point. It is necessary, in order to achieve a proper result, to end the conditioning with 0.7 to 1.0%, by weight of the dye solids, of beta-naphthol present. Thus, in the laboratory, this can be achieved by using as short a time as 5 minutes to heat from 10° to 98° C. In the plant, however, as much as 60 minutes is necessary to heat an 8,000 gallon batch and larger batches will taken even longer. It is necessary to predetermine the rate needed each time the batch size is changed, to achieve the proper percentage of beta-naphthol in the dyestuff when the batch reaches 98° C.

The dyestuff solids must be in a concentration between 1 and 10% in the conditioning mixture. The lower the concentration the smaller the particles which are achieved, whereas higher concentration gives larger particles and difficult stirring. Normally, one uses approximately 3% concentration of dyestuff in the conditioning reaction mixture.

In practice, with a plant batch of approximately 8,000 gallons, it is preferred to heat the whole mixture, immediately after adjusting the pH, with moderate agitation, following a prescribed curve plotted on graph paper with time being plotted against temperature. This is essentially a straight line from 14° to 58° C. over 35 minutes. A sharp increase in temperature is then made, to follow an essentially straight line from 58° C. to 98° C. in about 23–25 minutes. It is desirable that, during the heating, the beta-naphthol be extracted reproducibly to a point just before the melting point is reached. A slight melting will then be obtained. This point should then be quickly passed by rapid heating to get granular particles of the correct classification. The pH during this heating period falls from about 11.1 to about 10.1–10.2. The latter pH range is reached at approximately 40° C. and remains at this point during the remainder of the heating. If the heating is too rapid or the starting pH is too low, a heavy melt is obtained which breaks up into particles having more than 50% of a size greater than 20 mesh. If the heating is too slow or the pH too high the beta-naphthol is extracted too soon and the melting point is raised, so that little or no melting takes place, resulting in very fine particles 50–60% of which pass through a 60 mesh screen.

When the conditioning reaction mixture has reached 98° C. it is then reduced in temperature immediately to about 70–75° by the addition of ice. The improved granular, free-flowing, oil soluble dye is isolated by filtration and washed free of alkali and salts, after which it is dried.

The properties of the conditioned dyestuff are affected by a number of factors in the conditioning procedures. Some aspects of this have already been mentioned. It is imperative that the most important factors and their effects be kept in mind in carrying out this conditioning procedure.

The exact control of pH during conditioning is important. The preferred range, as stated above, is 11.0 to 11.2, with 10.8 to 11.5 being the outside limits. A lower pH produces an excess of particles coarser than 20 mesh and a higher pH produces a greater proportion of particles finer than 60 mesh. As will be seen below in discussion of the particle size range permissible, this is important to the final product.

The rate used in heating during the conditioning reaction is important. A very rapid heating produces a heavy melt which breaks up into particles outside the preferred range but heating too slowly extracts the beta-naphthol too rapidly which raises the melting point so that no melting takes place and the particles are too fine. The rate must be predetermined each time the batch size is changed so as to effect a beta-naphthol content of 0.7 to 1% when the temperature gets over 80° C.

As has been indicated above, it normally takes from 30 to 60 minutes to adjust the pH of a plant batch in preparation for the conditioning. It is important that this adjustment of the pH be carried out immediately after the coupling. Delay in adjusting the pH or delay there-after in starting the conditioning apparently causes a gradual extraction of the beta-naphthol at too early a stage. The result is that undesirable particle distribution, especially greater than 60 mesh, occurs and the product is dusty.

The size of the particles formed can be in some measure controlled by the rate of stirring since greater agitation tends to give smaller particles.

The concentration of the dyestuff in the conditioning mixture also effects the particle size as has been indicated above. Lower concentrations give small particles and higher concentrations give large particles.

The particle size can also be controlled to some extent by the variations in the excess beta-naphthol used in the coupling. Increased amounts of beta-naphthol give larger particles and excesses on the lower side of the permissible range give smaller particles.

The particle size is also partially dependent on the usage of surfactant. Small amounts of surfactant give larger particles, larger amounts of surfactant give small particles.

The final dyestuff of our invention is subjected to a screening in order to remove those particles which still remain larger than 20 mesh size. The dyestuff as used must have the following characteristics, greater than 20 mesh, less than 2.0%; greater than 40 mesh, 10–40%; greater than 60 mesh, 20–60%; smaller than 60 mesh, 10–60%. Consequently, for a good product it is desirable to have as little as possible retained on a 20 mesh screen. The products produced by the procedures described in the examples below tend to run approximately of the following composition: on 20 mesh, 4.8%; on 40 mesh, 44.3%; on 60 mesh, 40.8%; through 60 mesh, 10.1%. The effect of some of the conditioning factors mentioned above upon mesh size is illustrated in one of the examples below.

Our invention can be illustrated by the following examples.

EXAMPLE 1

Seventy-one grams of real AAXT (aminoazo-xylene-toluene hydrochloride, i.e. the hydrochloride of the product obtained by partially diazotizing a mixture of equal weights of mixed xylidines and mixed toluidines and allowing the diazo to couple into the remaining undiazotized xylidines and toluidines in the mixture) is slurried in 174 cc. water at 25–30° C. To the smooth slurry is added 36.5 g. real sulfuric acid (39.3 g. "as is" 93% sulfuric acid). The mixture is then diluted with water to 925 cc. and stirred for 4 hours to break up lumps. Ice is added to 0–2° C. The diazotization is then carried out using 26.7 g. real sodium nitrite as a 40% solution. (As usual, an excess of acid to Congo red paper must be present. Also, the reaction is carried to a starch iodide test for excess nitrous acid.)

The diazo mixture is then diluted to 1350 cc. with water and to the mix is added 2.5 g. of alkylarylpolyether alcohol surface active agent having a cloud point over 90° C.

A beta-naphthol solution is then prepared for the coupling. Fifteen and one tenth grams of real sodium hydroxide is dissolved in 190 cc. water and the solution is heated to 60° C. Fifty four and four tenths grams of beta-naphthol is added. The mixture is stirred at 60–63° C. to complete solution and the temperature is adjusted to 45° C.

For the coupling 53.2 g. of soda ash is dissolved in 900 cc. water at 20–25° C. The above-beta-naphthol solution is added and the total volume is adjusted to 1900 ml. at 10° C.

To this solution is then added the above diazo solution containing the surface active agent. The diazo solution is added to the beta-naphthol solution uniformly in about 2 hours, holding the temperature at 8–10° C. and the pH at 9.5 to 11. The addition is carried out at such a rate that there is always a test for beta naphthol when spotted with dianisidine tetrazo. There should never be a test for excess diazo using alkaline H-acid. The coupling mixture is then stirred about 30 minutes for completion.

About 14 g. of real sodium hydroxide solution is then added as a 24% solution to adjust the pH to 11.0 to 11.2 (when measured at 25° C.).

The conditioning is then carried out immediately as follows. The mixture is heated to 98° C. in 15–20 minutes under slow agitation. It is stirred 5 minutes at 98–100° C. and ice is then added quickly to reduce the temperature to about 50° C. or lower. The product is then removed by filtration, washed with water until free from alkali and beta-naphthol and then dried at about 85° C. to a moisture content of less than 0.5%.

During the heating period in the conditioning, the coupling product changes from a bright red solid to black particles and, at approx. 70° C., a melting stage occurs wherein the particles are floating in the mixture in a semi-oily condition. On further heating, granulation occurs giving a particle size the major portion of which falls between 20 and 60 mesh. There is thus obtained the red dye product in a dustless, free-flowing, non-caking granular form.

After screening through a 20 mesh unto a 70 mesh screen, the classification is as follows:

| | Percent |
|---|---|
| On #20 | 0 |
| On #40 | 50 |
| On #60 | 34 |
| Through #60 | 16 |

A similar result is obtained if the surface active agent is added to the coupling mixture after the coupling is complete but before the conditioning step.

An approximately similar result is obtained if other wetting agents of the same type are used as the surfacant. One such is sold under the trademark of Decresol NI (nonylphenol reacted with 9.5 moles of ethylene oxide).

EXAMPLE 2

The dyestuff is prepared in a plant size batch by the following procedure: Two diazo solutions exactly alike are made as follows. Water (168 gallons) is charged at 25–30° C. into a wooden tub of total capacity approximately 20 158 gallons. There is then added 530 pounds of real aminoazoxylene toluene mixed hydrochlorides (50–50 mixture of toluidine and xylidine diazotized and self-coupled). The mixture is stirred into a smooth slurry until there are no particles left on an 8 mesh screen. There is then added, over 10 minutes, 295 lbs. of 93% sulfuric acid. The mixture is diluted with water to a total volume of 865 gallons. The charge is stirred for 4 hours to a smooth slurry and iced to 2° C. At this point, the volume, including foam, is approximately 1800 gal. The mixture is kept at 2–3° C. with ice while 200 lb. of sodium nitrite (as a 40% solution) is gradually added, while keeping the mixture acid. More nitrite is added, if necessary, to complete the diazotization. When diazotization is complete there is added 19 lbs. of an alkylarylpolyether alcohol non-ionic surfactant of a cloud point greater than 90° C. The mixture is stirred at 0–2° C. for about 2 hours. The final volume is approximately 1680 gallons. A second diazo mixture is prepared similarly but timed so that the sodium nitrite is added one hour later.

A beta-naphthol solution is prepared in a 1440 gal. steel tank by charging 360 gal. of water followed by 944 lbs. of 24% solution of caustic soda. This is stirred and heated to 30° C. at which point 817 lbs. of beta naphthol is added. The volume is adjusted to 875 gal. at 30° C. and stirred to complete solution.

A 12,000 gallon wooden tub equipped with 6 steam guns and a wooden propeller stirrer with a fixed speed of 60 r.p.m. is charged with 1680 gal. of water at 20–25° C. Eight hundred pounds of soda ash is added and the mixture is stirred to complete solution. The beta-naphthol solution previously prepared is then charged. The volume is increased to 3600 gallons while cooling to 10° C. by adding ice and water. At 8–10° C., while maintaining the mixture alkaline to Brilliant Yellow paper, and keeping a positive test for beta naphthol and a negative test for diazo at all times, there is added both of the above prepared diazo solutions over a period of about 2 hours. Some additional beta naphthol solution, of the order of 1–2%, is frequently necessary. Ice is needed to maintain a temperature of 8–10°. The mixture is then stirred for 30 minutes without temperature control. The pH at this point should be approximately 9.2 to 9.6.

The conditioning is begun immediately, without delay. First there is added approximately 950 pounds of 24% caustic soda until a pH of 11.0 to 11.2 is obtained. The volume is adjusted to exactly 7,550 gallons. The temperature at this point is usually approximately 12–14° C. Steam is introduced into the mixture and the temperature is raised to 98° C. following a straight line relationship of time vs. temperature of 35 minutes for the temperature rise of 14° to 58°, followed by a somewhat steeper straight line relationship of 23 minutes for the rise to 98° C. As soon as 98° C. is reached the steam is shut off and cool water is added as necessary to prevent a boil over. Ice is added at once to cool below 75° C. The volume at this point is approximately 9300 gallons. The batch is then filtered and washed with water until the filtrate is free of beta naphthol and sulfate ion. The product is then air-dried at 85° C. The dried product is screened to remove most of the particles which are retained on a 20 mesh screen. In general, a batch which has been granulated by this procedure will pass at least 90% of its solid through a 20 mesh screen. Usually the greater proportion is retained on a 40 and 60 mesh screen and a maximum of 60% (preferably under 25%) passes through a 60 mesh screen. The product obtained is a free flowing non-caking, non-dusting product which dissolves in gasoline to the extent of more than 88% within 30 minutes.

EXAMPLE 3

The procedure in Example 2 is followed in a series of runs with certain variations in the procedure. The results, including the variations used are given in Table I.

equals 2 are each separately between 3:1 to 1:3; there being between 0.7 and 1.0% by weight of free beta-naphthol present in said composition; the said composition having the following particle size distribution:

greater than 20 mesh: less than 2.0%
greater than 40 mesh: 10–40%
greater than 60 mesh: 20–60%
smaller than 60 mesh: 10–60% the said composition being characterized by resistance to caking at temperatures from ambient to 65° C., by being free of dust, and by being readily soluble in hydrocarbons.

2. The compositions of claim 1 in which the ratio of $m$ equals 1 to $m$ equals 2 is 1:1 and the ratio of $n$ equals 1 to $n$ equals 2 is 1:1.

3. A process of preparing a non-caking, dustless composition for coloring hydrocarbons which comprises the successive steps of (1) adding an aqueous mixture of diazotized aminoazotoluene and diazotized aminoazoxylene, the said mixture of diazotized compounds being the product of diazotizing a mixture of toluidines and xylidines in the ratio range of 3:1 to 1:3 and coupling the said diazo mixture with another mole amount of the same mixture followed by diazotizing the mixed aminoazo compounds, to an aqueous mixture of beta naphthol, the beta naphthol being present in amounts 20–40% in excess of the stoichiometric to the amount of said diazo, there being present in the said naphthol solution sufficient alkali to keep the pH of the coupling mixture between 9.0 and 11.0 during the whole of said addition to form a beta naphthol coupling product; (2) then adjusting the pH of the mixture to 11.0 to 11.5 and adjusting the concentration to from 1–10% by weight of the beta naphthol coupling product; (3) adding at any time in steps (1) and (2) but before starting step (4) at least 0.1% by weight, based on the amount of said naphthol coupling product, of an alkyl aryl polyether alcohol having a cloud point above 90° C.; (4) then, without appreciable delay between completion of the steps of coupling and adjusting the pH and the step of conditioning, conditioning the said dyestuffs by heating the

*Table 1*
SCREEN ANALYSIS

| Run No. | Variation in Procedure | Retained on 20 Mesh | Retained on 20 Mesh | Retained on 60 Mesh | Through 60 Mesh | Property of Product |
|---|---|---|---|---|---|---|
| 1 | Control—Process of Example 2. | 4.8 | 44.3 | 40.3 | 10.1 | non-caking, dustless, free flowing good solubility. |
| 2 | pH 10.9 at start of conditioning. | 56.0 | 25.5 | 8.7 | 9.8 | low rate of solution in gasoline. |
| 3 | pH 11.6 at start of conditioning. | 3.0 | 6.9 | 29.0 | 61.1 | cakes. |
| 4 | Heating too fast (after 35 minutes temperature 68–70°). | 45.5 | 25.2 | 13.6 | 15.7 | low rate of solution in gasoline. |
| 5 | Coupling mixture allowed to stand 28 hours after pH adjusted to 11.2. | 0.1 | 15.9 | 18.0 | 66.0 | cakes. |

What is claimed is:

1. An oil soluble dye composition comprising a mixture of compounds of the formula

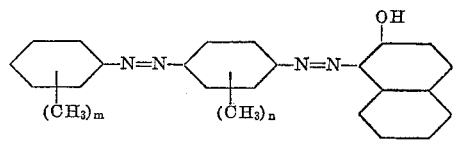

in which $m$ and $n$ are each positive integers less than 3, the said mixture having a composition range such that the ratio of compounds in which $m$ equals 1 to compounds in which $m$ equals 2 and also the ratio of compounds in which $n$ equals 1 to compounds in which $n$ said mixture to a temperature above 80° C. at a rate which leaves in the suspended dyestuff solids, when the said mixture reaches a temperature above 80°, 0.7 to 1.0% by weight free beta naphthol; and (5) reducing the temperature of said mixture below 75°, separating the solid naphthol coupling product, drying and removing most of the particles greater than 20 mesh in size.

4. The procedure of claim 3 in which the toluidines and xylidines in the amino azo toluene xylidine mixture are in the ratio of 1:1.

5. The procedure of claim 4 in which the surfactant is present in the beta naphthol solution during the coupling.

(References on following page)

References Cited in the file of this patent

UNITED STATES PATENTS

| | | |
|---|---|---|
| 1,719,944 | Risse et al. | July 9, 1929 |
| 1,986,116 | Payne | Jan. 1, 1935 |
| 2,849,329 | Braun | Aug. 26, 1958 |
| 2,938,897 | Armento | May 31, 1960 |

OTHER REFERENCES

Color Index, p. 3207, vol. 3, 2nd Edition, 1956, pub. by Am. Assoc. Tex. Chem. and Colorists, Lowell, Mass., 1957.

Triton, Surface Active Agents, pub. by Rohm & Haas, pp. 8 and 39, pub. 1951.